Jan. 19, 1965  J. H. RUDD  3,166,219
REMOTE CONTROLLED METERING DEVICE FOR FEED DISPENSERS
Filed Oct. 18, 1962  2 Sheets-Sheet 2

Joseph H. Rudd
INVENTOR.

BY *Clarence A. O'Brien*
*and Harvey B. Jacobson*
Attorneys

United States Patent Office 3,166,219
Patented Jan. 19, 1965

3,166,219
REMOTE CONTROLLED METERING DEVICE
FOR FEED DISPENSERS
Joseph H. Rudd, Manteca, Calif.
(P.O. Box 537, Ripon, Calif.)
Filed Oct. 18, 1962, Ser. No. 231,429
10 Claims. (Cl. 222—70)

This invention relates to a feed dispenser particularly adapted for use in connection with the feeding of cattle or the like within a dairy barn for example. More specifically, the feed dispenser of the present invention provides very accurate metering facilities especially useful in connection wtih a remote control system through which the amount of feed dispensed may be regulated as desired to control the diet of cattle, the feed dispensing unit thus constituting an improvement over the feed dispensers as disclosed and claimed in my prior U.S. Patent No. 3,034,688, May 15, 1962.

It is therefore a primary object of the present invention to provide a dispensing unit which is particularly useful in connection with a remote control system, to accurately meter and dispense granular material such as feed without direct supervision thereover.

It is therefore another object of the present invention in accordance with the foregoing object, to provide a feed dispenser capable of accurately dispensing a metered amount of feed without clogging regardless of the amount of feed to be dispensed within a given time interval.

A still further object of the present invention is to provide a metering feed dispenser which is adjustable within limits to vary the amount of feed dispensed within a given interval of time. Facilities are also provided for varying the interval of time within which feed is dispensed.

An additional object of the present invention is to provide a metering feed dispensing device particularly suited for remote control in connection with the feeding interval in view of the accuracy with which the dispensing unit is capable of dispensnig feed and its ability to reliably dispense feed at a predictable rate.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a perspective view of the components of the feed dispensing unit of the present invention.

FIGURE 5 is an exemplary circuit diagram associated with the feed dispensing system of the present invention.

Figure 1:
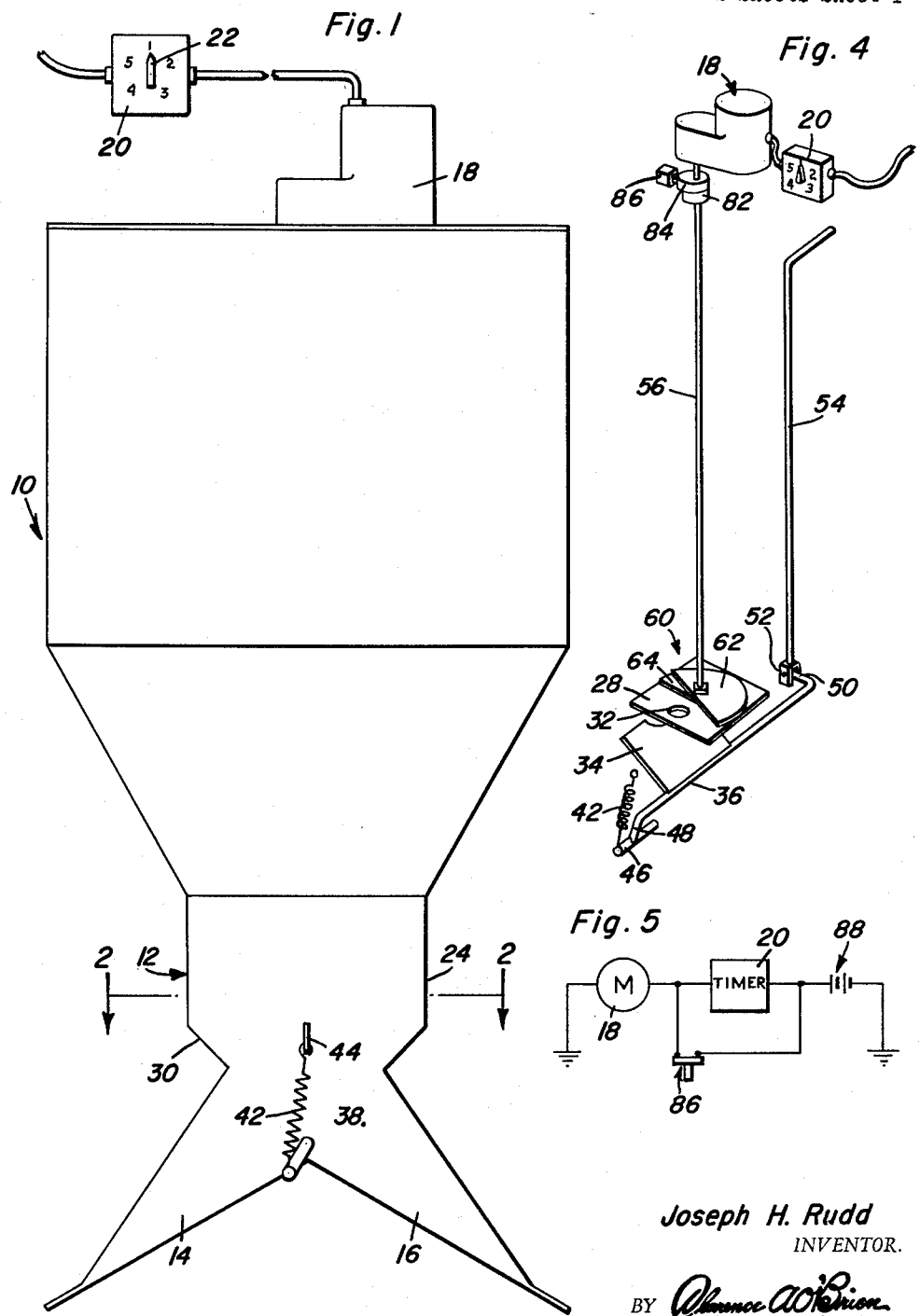
FIGURE 1 is a front elevational view of a feed dispensing unit installed at a feed dispensing station.

Referring now to the drawings in detail, it will be observed that located at a feed dispensing station, is a feed storing hopper generally referred to by reference numeral 10 to which the feed dispensing unit 12 is connected at a bottom outlet end so that a metered amount of feed may be discharged into feed-receiving troughs within a dairy barn for example by a pair of diverging passage portions 14 and 16. Mounted above the hopper or at any other convenient location spaced adjacent the metering unit 12, is a drive motor assembly 18 electrically powered and controlled from some remote location by means of a manually settable control box 20 connected to a suitable source of electrical power. It will therefore be apparent, that by manually setting the control knob 22 on the control box 20, the feeding intervals during which the metering unit 12 is operative, may be set in accordance with any desired dietary restrictions or conditions.

Figure 2:
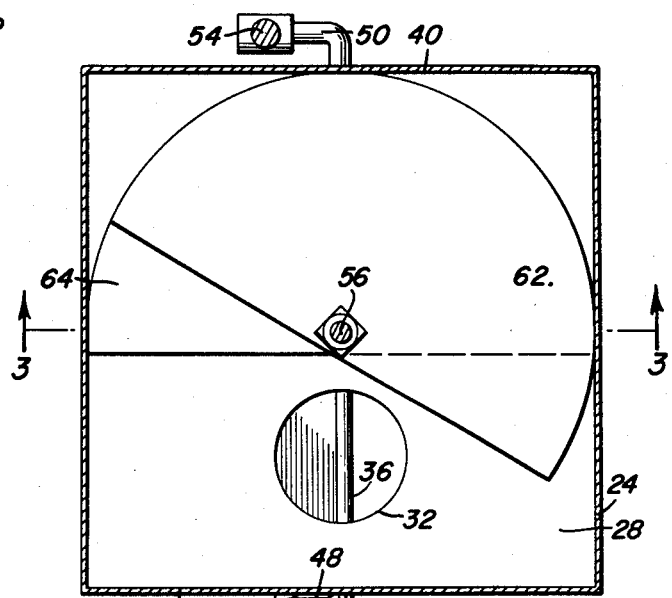
FIGURE 2 is a transverse sectional view taken substantially through a plane indicated by section line 2—2 in FIGURE 1.
Figure 3:
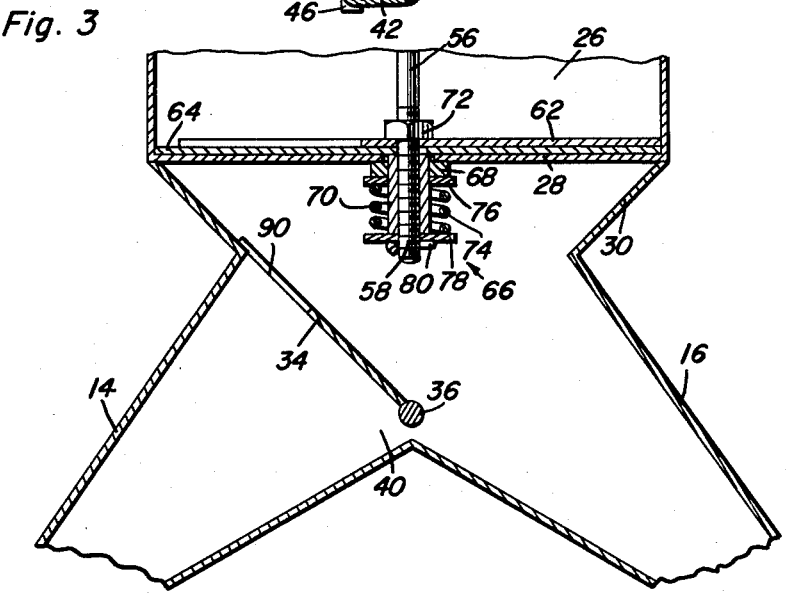
FIGURE 3 is a partial sectional view taken substantially through a plane indicated by section line 3—3 in FIGURE 2.

Referring now to FIGURES 2 and 3 in particular, it will be observed that the metering unit 12 includes enclosing side walls 24 connected to the lower outlet end of the hopper 10 so as to define therebetween a predetermined volume necessary to support the free flow of feed. Thus, the side walls 24 define a metering chamber 26 between the lower outlet end of the hopper 10 and a bottom wall 28 which is connected to the side walls 24. Connected to the side walls 24 and converging downwardly below the bottom wall 28, is the connecting wall portion 30 which is connected to the diverging passage portions 14 and 16 through which feed is dispensed as hereinbefore indicated. Accordingly, a circular opening or outlet 32 is formed in the bottom wall 28 of such dimension as to permit the free flow of feed without clogging. Thus, feed will be dispensed through the outlet 32 and delivered through either the passage portion 14 or 16. A deflector member 34 is therefore pivotally mounted by an oscillatable shaft 36 which extends through and is rotatably mounted between front and rear wall portions 38 and 40 of the dispenser. It will therefore be observed, that the oscillatable shaft 36 is angularly displaceable about an axis centrally aligned below the opening 32 so that feed discharged therethrough may be equally deflected into the discharge passage 14 or 16. The deflector member is therefore biased to one of its two extreme positions by an over center spring member 42 an upper end of which is anchored to the front wall 38 by the anchoring projection 44 while a lower end of the spring is connected to projecting portion 46 at the lower end of a downwardly depending portion 48 of the oscillatable shaft 36. The shaft 36 thus projects out of the front wall 38 so as to present the downwardly depending portion 48 while the rear portion of the shaft 36 projects out of the rear wall 40 and is connected by a laterally extending portion 50 to a clevis element 52 at the lower end of a manually controlled rod 54. Accordingly, the deflector member 34 may be displaced to either of its extreme positions in which it is held by the bias of the over center spring 42 by manipulation of the control rod 54. Feed will therefore be dispensed into the selected discharge passage when the outlet opening 32 is uncovered.

It will be observed from FIGURES 2 and 4, that the outlet metering opening 32 is disposed in offset relation to the geometric center of the metering chamber 26 through which the rotational axis of a rotatable drive shaft 56 extends. The lower end portion of the drive shaft 56 is threaded at 58 and projects through an opening in the stationary bottom wall 28 so as to rotatably mount thereabove, an adjustable metering plate assembly generally referred to by reference numeral 60. The metering plate assembly includes a pair of semi-circular plate members 62 and 64 which are held in angularly adjusted positions with respect to each other and with respect to the drive shaft 56 by means of a clamping assembly generally referred to by reference numeral 66 as more clearly seen in FIGURE 3. The clamping assembly includes a bushing element 68 connected as by welding to the underside of the stationary bottom wall 28 for rotatably receiving therethrough, a sleeve 70 disposed about the threaded end portion 58 of the drive shaft 56. The sleeve 70 extends loosely through the central opening of the stationary bottom wall 28 and bears against the lower semi-circular plate 64 so as to clamp both plates between the upper end of the sleeve 70 and a clamping nut 72 threadedly received on the threaded portion 58 of the drive shaft. Clamping of the plates 62 and 64 between the nut 72 and the sleeve 70 is effected against the bias of a spring 74 which reacts between a bearing washer 76 seated against the bushing 68 and a thrust washer 78 held assembled at the lower end of the threaded portion 58 by means of a cotter pin 80. Accordingly, by threaded retraction of the clamping nut 72 in an upward direction, loosening of the plates will be achieved immediately by the spring 74 so that said plates may be angularly readjusted to form a circular configuration having an angularly adjusted sector gap which may vary between a semi-circle and nothing when the plate assembly forms a complete circle. When tightened, the clamp assembly 66 will be effective to produce rotation of the plate members 62 and 64 with the drive shaft 56 in their angularly adjusted relationship so as to expose the outlet opening 32 during a preset portion of the rotational cycle of the metering assembly 60 in response to rotation of the drive shaft 56. The drive shaft 56 is therefore rotated at a low and constant rate of speed as for example 7 r.p.m.

Referring now to FIGURES 4 and 5 in particular, it will be observed that the drive shaft is connected by the coupling 82 to the output of the low speed motor assembly 18. Each revolution of the drive shaft 56 will therefore be operative through an eccentric portion 84 of the coupling 82 to actuate a limit switch 86 at the same angular position of the drive shaft 56. By setting the timer 20 for a predetermined feeding interval, the motor assembly 18 may be energized for a predetermined period of time from any suitable source of electric power 88 as diagrammatically illustrated in FIGURE 5 to thereby determine the number of rotational cycles that the metering plate assembly 60 undergoes. Inasmuch as a predetermined volume of feed will be discharged through the metering outlet 32 each rotational cycle, the total volume of feed dispensed may be controlled through the timer 20. It will be observed, however, that each time the drive shaft 56 makes one revolution, it opens the limit switch 86 so as to thereby open a parallel electrical path through which the motor 18 may be energized bypassing the timer 20. When the timer is set, it will be appreciated that an electrical path is established for a predetermined time interval in order to maintain the motor 18 energized. Should the electrical path be interrupted by the timer at the end of a timing interval with the drive shaft 56 at a position in which the outlet opening 32 is exposed, the limit switch 86 will be closed by the eccentric portion 84 on the coupling 82 so as to maintain the motor energized for a sufficient portion of the rotational cycle of the drive shaft 86 so as to displace the metering assembly 60 to a position covering the outlet opening 32. The limit switch 86 will then open. Accordingly, closing of the outlet 32 is assured at the end of the feeding interval as set by the time control mechanism 20.

From the foregoing description, the operation and utility of the dispensing unit of the present invention and the system with which it is associated, will be apparent. It will therefore be recognized, that the amount of feed dispensed each rotational cycle of the dispenser may be regulated between zero when the semi-circular plates 62 and 64 form a complete circle to a volumetric flow value wherein the outlet opening 32 is exposed at most during one-half of a rotational cycle of the adjustable metering assembly 60. It will be appreciated, that the dimension of the outlet opening 32 must be large enough so that the feed by virtue of its physical characteristics, may flow relatively freely. Thus, the size of the opening 32 is selected so as to obtain such a free flow of material and is fixed unlike metering devices heretofore utilized wherein the outlet opening is variable and hence unreliable with respect to the smaller flow settings thereof. The volumetric rate of flow according to the present invention is regulated instead by an adjusted portion of a rotational cycle during which the outlet opening is exposed. More accurate metering of feed material is thereby achieved. The feed may therefore be discharged through one of the diverging delivery passage portions 14 and 16 selected by means of the control rod 54 positioning the deflector 34 to one of its extreme positions. It will also be observed that the deflector is provided with a notched out portion 90 so as not to interfere with the clamping assembly 66 by means of which the adjustable metering assembly 60 is secured to the lower end portion of the drive shaft 56. The clamping assembly 66 as hereinbefore described, also permits easy resetting of the assembly 60 in order to vary the amount of feed discharged each rotational cycle. The amount discharged each rotational cycle may therefore be varied between zero and the amount of flow occurring through the exposed opening 32 when the semi-circular plates 62 and 64 form a semi-circular configuration. It will also be observed, that the dispensing unit may be positioned below any feed storing hopper and wired to some remote control station where a plurality of such dispensing units are utilized for centralized feeding interval control.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a remote time controlled feed dispensing system, an adjustable feed dispensing unit comprising, metering chamber means having a fixed restricted outlet through which feed may freely flow at a predetermined constant rate, rotatable means mounted within said metering chamber means for movement throught a fixed cycle of movement at a constant rate of speed, adjustable means mounted on said rotatable means for closing said outlet during a preset portion of said cycle which is more than one-half of said fixed cycle of movement to regulate the volumetric flow of feed during each cycle of movement, and remotely controlled means for predetermining the number of cycles of movement and volume of feed dispensed, and limit means operatively connected to the rotatable means to insure stopping of the adjustable means in a position closing said outlet.

2. The combination of claim 1, wherein said adjustable means comprises a pair of semi-circular plates mounted on said rotatable means in angularly adjusted relation to each other and releasable friction clamp means for holding said plates in angularly adjusted relation on the rotatable means.

3. The combination of claim 2 wherein said rotatable means comprises, low speed motor means mounted in spaced relation above the metering chamber means, a drive shaft connected to the motor means and extending downwardly through the metering chamber means, said shaft having a connecting portion at a lower end thereof to which said adjustable means is connected.

4. The combination of claim 3, wherein the metering chamber means including side walls adapted to be connected to a lower end of a feed hopper for receiving a predetermined volume of feed therein, and a bottom wall fixed to the side walls, said outlet being formed in the bottom wall in offset relation to the rotatable means, said bottom wall forming a slide bearing for the adjustable means rotatable thereabove.

5. The combination of claim 4, including diverging passages connected to a lower end of the metering chamber means, deflector means pivotally mounted about an axis aligned with the outlet and the rotatable means and means biasing the deflector means to either of two positions on opposite sides of the outlet for diverting feed to one of said diverging passages.

6. In a remote time controlled feed dispensing system, an adjustable feed dispensing unit comprising, metering chamber means having a fixed restricted outlet through which feed may freely flow at a predetermined constant rate, rotatable means mounted within said metering chamber means for movement throught a fixed cycle of movement at a constant rate of speed, adjustable means mounted on said rotatable means for closing said outlet during a preset portion of said cycle which is more than one-half of said fixed cycle of movement to regulate the volumetric flow of feed during each cycle of movement, said adjustable means comprising a pair of semi-circular plates mounted on said rotatable means in angularly adjusted relation to each other and releasable friction clamp means for holding said plates in angularly adjusted relation on the rotatable means.

7. The combination of claim 6, wherein the metering chamber means includes side walls adapted to be connected to a lower end of a feed hopper for receiving a predetermined volume of feed therein, and a bottom wall fixed to the side walls, said outlet being formed in the bottom wall in offset relation to the rotatable means, said bottom wall forming a slide bearing for the adjustable means rotatable thereabove.

8. In a remote time controlled feed dispensing system, an adjustable feed dispensing unit comprising, metering chamber means having a fixed restricted outlet through which feed may freely flow at a predetermined constant rate, rotatable means mounted within said metering chamber means for movement through a fixed cycle of movement at a constant rate of speed, adjustable means mounted on said rotatable means for closing said outlet during a preset portion of said cycle which is more than one-half of said fixed cycle of movement to regulate the volumetric flow of speed during each cycle of movement, said rotatable means comprising, low speed motor means mounted in spaced relation above the metering chamber means, a drive shaft connected to the motor means and extending downwardly through the metering chamber means, said shaft having a connecting portion at a lower end thereof to which said adjustable means is connected, and remotely controlled means for predetermining the number of cycles of movement and volume of feed dispensed, and limit means operatively connected to the rotatable means to insure stopping of the adjustable means in a position closing said outlet.

9. In a remote time-controlled feed dispensing system, an adjustable feed dispensing unit comprising, metering chamber means having a fixed restricted outlet through which feed may freely flow at a predetermined constant rate, rotatable means mounted within said metering chamber means for movement through a fixed cycle of movement at a constant rate of speed, and adjustable means mounted on said rotatable means for closing said outlet comprising, a pair of semi-circular plates mounted on said rotatable means in angularly adjusted relation to each other and releasable friction clamp means for holding said plates in angularly adjusted relation on the rotatable means for periodically exposing said outlet in response to rotation of the rotatable means.

10. In a feed dispensing system, a metering chamber having a bottom wall with a fixed outlet therein, a drive member rotatably mounted above the metering chamber and extending through the bottom wall thereof, at least two angularly overlapping plates mounted on the drive member above the bottom wall defining an angular gap therebetween exposing the outlet once each revolution of the drive member and friction clamp means mounted on the drive member for releasably holding the plates in angularly overlapping relation.

References Cited by the Examiner
UNITED STATES PATENTS

| | | | |
|---|---|---|---|
| 913,605 | 2/09 | Yates | 222—294 |
| 2,190,094 | 2/40 | Brenchley | 193—31 |
| 2,609,966 | 9/52 | Henry | 222—70 |
| 2,975,937 | 3/61 | Totten | 222—70 |
| 3,132,769 | 5/64 | Zehrbach | 222—70 |

LOUIS J. DEMBO, *Primary Examiner.*

RAPHAEL M. LUPO, *Examiner.*